United States Patent [19]

Miles

[11] Patent Number: 4,670,303
[45] Date of Patent: Jun. 2, 1987

[54] COATING METHOD FOR PREPARING COMPOSITE MATERIAL

[75] Inventor: Brynley J. Miles, Cirencester, England

[73] Assignee: United Kingdom Atomic Energy Authority, London, England

[21] Appl. No.: 831,058

[22] Filed: Feb. 19, 1986

Related U.S. Application Data

[63] Continuation of Ser. No. 683,023, Dec. 18, 1984, abandoned.

[30] Foreign Application Priority Data

Dec. 19, 1983 [GB] United Kingdom ............... 8333794

[51] Int. Cl.$^4$ .................... B01J 13/02; B05D 1/34
[52] U.S. Cl. ................... 427/213.31; 424/450; 427/196; 428/402.24; 501/81; 501/82
[58] Field of Search ............ 427/213.31, 196; 428/402.24; 501/81, 82

[56] References Cited

U.S. PATENT DOCUMENTS

| | | | |
|---|---|---|---|
| 3,362,846 | 1/1968 | Lee et al. ................. | 428/357 X |
| 3,528,809 | 9/1970 | Farnand et al. ............ | 419/5 |
| 3,782,075 | 1/1974 | Kirkland .................... | 55/386 X |
| 3,854,981 | 12/1974 | Schon et al. ............... | 427/212 |
| 4,059,544 | 11/1977 | Yamaguchi et al. ......... | 501/82 |
| 4,280,816 | 7/1981 | Elahi ........................ | 424/1.1 X |
| 4,349,456 | 9/1982 | Sowman .................... | 428/402.24 |

Primary Examiner—Richard D. Lovering
Attorney, Agent, or Firm—Larson and Taylor

[57] ABSTRACT

The present invention relates to materials and more particularly to composite materials in which a selected substance is supported by a support material.

A composite material in accordance with the present invention comprises porous hollow particles of an inorganic material in which there is supported a selected substance (such as chromagraphic organic gel, or a liquid for use in two-phase separation processes).

The porous hollow particles may be formed from, for example, a material such as kieselguhr and/or an inorganic oxide.

The porous hollow particles may be formed by coating a fugitive core material (e.g. organic beads) with inorganic material and heating to remove the fugitive core material.

13 Claims, No Drawings

COATING METHOD FOR PREPARING COMPOSITE MATERIAL

This is a continuation of application Ser. No. 683,023, filed Dec. 18, 1984, and now abandoned.

The present invention relates to materials and more particularly to composite materials and the preparation of such composite materials.

According to one aspect of the present invention there is provided a composite material comprising porous, hollow particles of inorganic material carrying a selected substance.

It will be appreciated that in accordance with the present invention the selected substance is accommodated predominately within porous shells provided by the hollow particles. It will also be appreciated that there may be a minor proportion of selected substance in the pores of the shells and/or on the surface of the particles.

The particles may conveniently be substantially spheroidal or may be substantially spherical.

It will be understood that the porous shell of the porous, hollow particles may be permeable such as to allow reagents and reactants to reach the selected substance and to allow elution of species from the selected substance. Preferably a selected substance is introduced or formed in prefabricated porous hollow particles; in these circumstances the porous shells must be permeable such as to allow the introduction of the selected substance or introduction of reagents for forming the selected substance.

Thus, the term "porous" as used in this Specification embraces "permeable" as discussed in the immediately preceding paragraph herein.

The selected substance may be chosen from a wide range of substances according to the substance it is desired to incorporate in the composite material. For example, the selected substance may be an active organic gel. By way of example, such a gel may be active with regard to chemical species. Thus, for example, a gel may be active with regard to chemical species by predominately chemical interaction (e.g. the gel may have ion-exchange properties, affinity chromatography properties, or ampholytic properties) or may be active with regard to chemical species by predominately physical interaction (such as in gel filtration and molecular sieving processes).

By way of further example the selected substance may be a biochemically active substance such as a substance consisting of or containing biological cells or an enzyme. The biologically active substance may be in the form of an organic gel.

By way of yet further example the selected substance may be such that the composite material can be used in two-phase separation. Thus, for example, where the composite material is to be used in aqueous media the selected substance may be an organic substance (e.g. a liquid) substantially immiscible with aqueous media.

It is to be further understood that in accordance with the present invention the porous hollow particles of inorganic material may be considered to be acting as a "support material" for a selected substance whenever a selected substance is carried by the porous inorganic material. This embraces, for example, where the porous inorganic material adds mechanical stability to deformable substances (e.g. as in the case of a selected substance comprising an organic deformable gel) and also embraces where the porous inorganic material carries the selected substance without necessarily providing it with mechanical stability throughout, for example as in the case when a liquid is retained within a hollow porous particle of inorganic material in accordance with the present invention.

According to a further aspect of the present invention there is provided a process for the preparation of a composite material comprising porous hollow particles of inorganic material carrying a selected substance, which comprises coating a fugitive core material with inorganic material or a precursor therefor, removing the fugitive core material to produce porous hollow particles of inorganic material and introducing the selected substance or a precursor therefor to the porous, hollow particles.

By way of example the coating of the fugitive core material may be effected by applying inorganic material powder to the fugitive core material in the presence of a small amount of water to make the powder moist and adherent. As an alternative to using a small amount of water an aqueous solution (e.g. an aqueous solution of a metal salt) may be used to moisten the powder and by this means it is possible to introduce further inorganic material to the coating.

The addition of inorganic material and water (or aqueous solution) during coating should be controlled so that no excess of either occurs and the coating remains uniform.

The coating may be conveniently carried out for example, in a spheroidiser. Thus the powder moistened as hereinbefore disclosed may be applied to the fugitive core material until a sufficiently thick coating has been built up on the core material.

Preferably the core material is a fugitive core material which can be decomposed on heating so that after coating core material can be removed by the application of heat.

Examples of fugitive core materials are organic resin beads (i.e. synthetic ion-exchange resin beads) and alginate spheres.

Where the fugitive core material is to be removed by heating it should be combustible and released in a controlled manner (e.g. as $CO_2$ finally) through the porosity of the "shell". The fugitive core material and products produced therefrom on heating should not interact adversely with the "shell". (For example, some materials (e.g. polysulphonated resins) decompose giving $SO_2$ which can react undesirably with some inorganic materials of the shell).

Subsequently to the fabrication of the porous hollow particles the selected substance can be introduced as hereinbefore discussed.

The hollow porous particles of inorganic material may be arranged to carry a selected material by any convenient method. Where the selected substance is a liquid the liquid may be introduced through the particles and retained therein by surface tension forces or by forming a membrane around each of the particles.

A precursor for a selected substance may be introduced to the particles and subsequently treated to form the selected substance. For example, a fluid precursor may be introduced to the particles and subsequently gelled (e.g. by precipitation and/or cross-linking, or by polymerisation).

Reference may be made to British Patent Specification No. 1514707 and British Patent Specification No. 1602432 by way of example with regard to examples of suitable methods of forming selected substances in a support material.

Any suitable inorganic material may be used to form porous hollow particles for use in accordance with the present invention. Examples are titanium dioxide, calcium phosphate, aluminium oxide, zirconium oxide, barium sulphate, calcium sulphate and natural earths such as bentonite, kieselguhr and the diatomaceous substance available under the Trade Name of "Celite".

Mixtures of inorganic materials may be used in the formation of hollow spheres for use in accordance with the present invention. (For example a powder mixture of kieselguhr with the addition of a further inorganic material such as an oxide (e.g. titania) may be used). As hereinbefore mentioned a solution containing a further inorganic material may be used to moisten powders applied to a fugitive core material in the preparation of particles suitable for use in accordance with the present invention so that it is possible to prepare porous hollow particles (e.g. spheres) of inorganic material of a desired composition.

According to a further aspect of the present invention there is provided a process for the selective separation of a chosen component from a fluid which comprises contacting the fluid with a composite material comprising porous hollow particles of inorganic material carrying a selected substance capable of retaining the chosen component from the fluid such that the chosen component is retained by the selected substance.

The chosen component (e.g. a chosen chemical species) may subsequently be recovered from the composite particles and the particles reused, if desired, in a further separation operation.

By way of example the composite material may comprise porous hollow particles of inorganic material containing a selected substance comprising an affinity chromatography reagent. Thus, for example, composite material comprising porous hollow particles of inorganic material (e.g. kieselguhr) containing and carrying an organic affinity chromatography gel (e.g. agarose gel carrying an affinity chromatography agent (such as the dye Cibacron Blue 3G-A ex. Ciba-Geigy)) can be contacted with a biologically produced fluid (e.g. a raw cell culture or fermentation broth) so that the gel removes the selected component into the particles from the fluid by affinity chromatography. Subsequently the selected components may be removed from the particles by suitable elution.

The present invention will now be described by way of example only as follows:

EXAMPLE 1

A solution of LB Manucol (sodium alginate ex Alginate Industries Ltd.) (60 g), glycerol (100 ml) and demineralised water (1 liter) was added dropwise to a solution of calcium chloride (30 g), glycerol (300 ml) and water (3 liters) to produce precipitated alginate spheres.

These spheres were dried at room temperature overnight such that they remained moist and their final size of 3 to 4 millimeters diameter. The moist spheres were spheroidised with incremental amounts of kieselguhr and water to produce coatings of approximately 0.5 millimeter thickness on the alginate spheres.

The coated alginate spheres were sintered at 600° C. for 24 hours and at 850° C. for one hour to give robust, symmetrical, porous, hollow spheres of ~4 millimeters outside diameter.

EXAMPLE 2

The procedure of Example 1 was followed with the exception that the alginate spheres were dried at room temperature over a period of several days to a size of 1 to 2 millimeters diameter. These spheres were then sprayed with water and spheroidised with incremental amounts of kieselguhr and water to build up spheres with an approximate coating of 0.5 millimeter thickness. The coated spheres were sintered at 600° C. for 24 hours and at 850° C. for one hour. This gave robust, symmetrical, porous, hollow spheres of approximately 3 millimeters diameter.

EXAMPLE 3

A solution containing LM Manucol (sodium alginate ex Alginate Industries Ltd) (5 g), glycerol (10 m) and demineralised water (1 liter) was added dropwise to a solution of calcium chloride (30 g), glycerol (30 ml) and water (3 liters) to produce alginate spheres. These were carefully dried first with methanol and then in an oven at 70° C. to give dried spheres of ~400 microns diameter.

These spheres were grown to 800 micron spheres in a spheroidiser with incremental additions of kieselguhr and water. Finally the resulting coated spheres were sintered at 850° C. for one hour to give porous, hollow spheres.

EXAMPLE 4

Amberlyst A-26 (macro-reticular resin beads ex BDH) was sieved and a 400 micron fraction was coated with kieselguhr and water by incremental additions in a spheroidiser as in Example 3 to give spheroids of 500 to 1000 microns outside diameter.

The spheroids were sintered at 800° C. for one hour. This gave porous, hollow spheres.

EXAMPLE 5

Amberlyst A-26 (600 micron diameter fraction), (50 g), was well moistened and coated in a spheroidiser with incremental additions of an intimate mixture of titania (ex May and Baker) (80 g) and Amberlyst A-26 (ground and sieved to <80 microns) (10 g) with water as a binder. The resulting spheres (which were ~800 microns in diameter) were sintered at 900° C. for one hour to give porous hollow spheres of titania.

EXAMPLE 6

Porous, hollow spheres of kieselguhr (700–800μ diameter) were prepared in a manner similar to that of Example 3.

A sample (25 ml) of these spheres was prewarmed (50° C.), impregnated with molten agarose (4% w/v in water) and autoclaved at 10 psi for 20 minutes.

When cool the resulting material was rubbed through a 1000μ mesh sieve. The excess, free and less dense agarose was separated and removed by decantation to leave composite material spheres comprising hollow kieselguhr particles containing agarose gel.

EXAMPLE 7

Composite spheres prepared as in Example 6 were drained and impregnated with 4% Cibacron Blue 3 GA dye (Ciba-Geigy) on a water bath at 70° C.; the spheres and dye were equilibrated at this temperature before mixing together.

After 2 hours solid NaCl (4.5 g) followed by Na$_2$CO$_3$ (8.1 ml of 10% w/v) was added to the mixture of spheres and dye and mixed well. The resulting mixture was heated at 70° C. for 17 hours after which it was allowed to cool. Excess dye was washed off by decantation and the resulting spheres drained and stirred in a 0.1% w/v solution of sodium azide.

The resulting product comprised composite spheres with each composite sphere comprising hollow kieselguhr particles containing an agarose gel carrying Cibacron Blue 3 GA dye affinity chromatography agent.

Sample composite spheres were sectioned and showed substantially complete filling of the interior of the hollow spheres with agarose gel and a substantially uniform uptake of affinity chromatography agent dye by the agarose gel.

EXAMPLE 8

A 10ml column of composite material spheres prepared in accordance with Example 7 was prepared and first washed with 1:1 w/v ethanol/water for 4 hours to remove labile dye and any other non-firmly bound material then with 1% w/v NaCl until a steady base line was shown on a recorder coupled to a u.v. monitor absorbing at 280 nm.

The column was loaded with 1.2% w/v Human Serum Albumin (HSA) in 1% NaCl to an equilibrated plateau, washed with 1% w/v NaCl to remove unbound H.S.A. and then eluted with 2% KSCN in 1% NaCl. Fractions were pooled for analysis.

Results are given in the Tables 1 and 2.

EXAMPLE 9

The procedure of Example 8 was repeated with another sample of composite material spheres.

Results are given in the Tables 1 and 2.

TABLE 1

| Example No. | g Agarose/g kieselguhr | mg dye/ g Agarose | % of composite water | % of composite Agarose |
|---|---|---|---|---|
| 8 | 0.054 | 138.8 | 52 | 2.4 |
| 9 | 0.03 | 153.3 | 54 | 1.3 |

TABLE 2

| Example No. | Capacity mg HSA/ml composite | Capacity mg HSA/ g Agarose | Capacity Mg HSA/ mg dye |
|---|---|---|---|
| 8 | 6.6 | 395.2 | 2.85 |
| 9 | 7.7 | 836.9 | 5.46 |

I claim:

1. A process for the preparation of a composite material comprising porous hollow particles of inorganic material, carrying a selected organic substance which comprises coating a solid, particulate fugitive core material with particulate inorganic material or a particulate precursor therefor, removing the fugitive core material to produce porous hollow particles of inorganic material, and introducing a selected organic substance or precursor therefor into the porous hollow particles in an amount sufficient to substantially fill said porous hollow particle with said organic substance or a precursor thereof.

2. A process as claimed in claim 1 wherein the fugitive core material is coated by applying inorganic material powder to the fugitive core material in the presence of a small amount of water or an aqueous solution to make the powder moist and adherent.

3. A process as claimed in claim 1 wherein the fugitive core material is removed by the application of heat.

4. A process as claimed in claim 1 wherein the fugitive core material comprises an organic resin bead or an alginate sphere.

5. A process as claimed in claim 1 wherein a fluid precursor for the selected substance is introduced into the hollow particles and wherein the precursor is subsequently gelled to give the selected substance.

6. A process as claimed in claim 1 wherein the selected substance comprises an active organic gel.

7. A process according to claim 6 wherein said gel is active with regard to chemical species by predominantly chemical interaction.

8. A process as claimed in claim 7 wherein the active organic gel has ion-exchange properties, affinity chromatography properties, or ampholytic properties.

9. A process according to claim 6 wherein said gel is active with regard to chemical species by predominantly physical interaction.

10. A process as claimed in claim 9 wherein said physical interaction comprises gel filtration or molecular sieving.

11. A process as claimed in claim 1 wherein the selected substance comprises a biochemically active substance.

12. A process as claimed in claim 1 wherein the selected substance comprises an organic substance substantially immisicible with aqueous media.

13. A process as claimed in claim 1 wherein the particles are substantially spheroidal or substantially spherical.

* * * * *